J. MILLER.
Device for Making Tea, Coffee and other Extracts.

No. 203,179. Patented April 30, 1878.

WITNESSES:
W. W. Hollingsworth
Edw. W. Byrn

INVENTOR:
Jonathan Miller
BY
ATTORNEYS.

UNITED STATES PATENT OFFICE.

JONATHAN MILLER, OF HIMROD'S, NEW YORK, ASSIGNOR TO PRESSURE EXTRACT COMPANY, OF TRENTON, NEW JERSEY.

IMPROVEMENT IN DEVICES FOR MAKING TEA, COFFEE, AND OTHER EXTRACTS.

Specification forming part of Letters Patent No. 203,179, dated April 30, 1878; application filed October 27, 1877.

*To all whom it may concern:*

Be it known that I, JONATHAN MILLER, of Himrod's, in the county of Yates and State of New York, have invented a new and Improved Device for Making Tea, Coffee, and other Extracts; and I do hereby declare that the following is a full, clear, and exact description of the same, reference being had to the accompanying drawings, forming part of this specification, in which—

Figure 1:
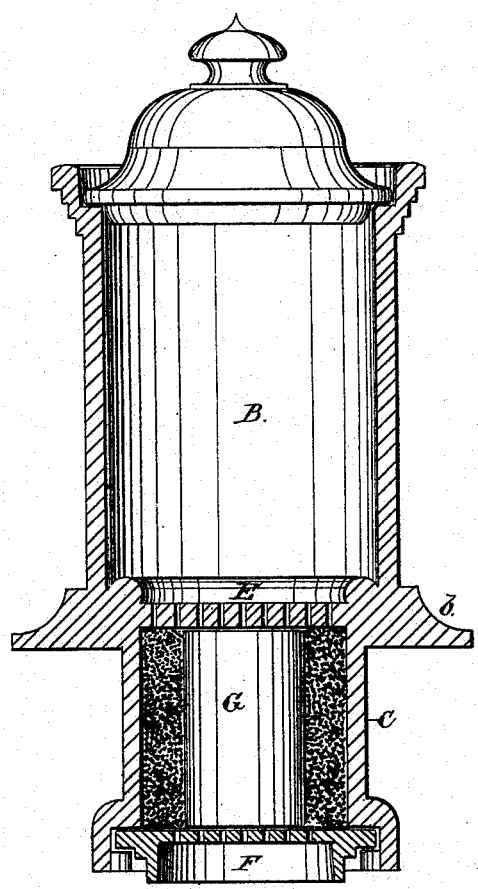
Figure 2:
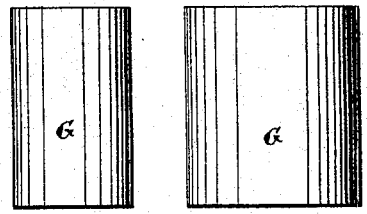

Figure 1 is a vertical section of an apparatus with my invention shown applied; Fig. 2, detail views of the graduated displacing cylinders hereinafter referred to.

My invention relates to an improved apparatus for making tea, coffee, and other extracts pursuant to the method patented by me May 2, 1876, in which a liquid-receptacle is combined with a subjacent receptacle or press for the ground or porous material, which press is provided with openings above and below for the access and discharge of the liquid, and has also a removable portion, provided with rigid fastenings, for the introduction of the porous material.

The improvement consists in the combination, with said press, of one or more cylinders or bodies of different sizes, designed to be placed in said press for the purpose of displacing a portion of the material to suit the special requirements as to the amount of the extract to be made, and yet preserve at a contant thickness in vertical direction the amounts of material through which the liquid has to pass.

In the drawings, B represents the liquid-receptacle; C, the attached subjacent press; and b, a flange, which is adapted to support the device above any suitable urn or receptacle for the extract.

The press is made with a stationary end plate, E, and a removable one, F, both perforated, and the removable one, which may be located at either end of the press, is adapted to be rigidly fastened to the same by means of lugs, bayonet-joints, or other suitable devices.

As thus far described the apparatus does not differ materially from that shown in my said previous patent; but with such apparatus it will be seen that the amount of coffee or extract to be made cannot be varied except by varying the size of the apparatus, as a smaller quantity of material would not completely fill the same press, and consequently would not embody the pressure principle described in my said patent.

To adapt the chamber C to the different quantities of extract to be made, and yet preserve the pressure principle with a constant depth of material, through which the liquid must pass, I employ plain imperforate displacing-bodies G, of graduated sizes, which may be made either solid or hollow, and of stoneware, metal, or any other suitable material. These displacing-bodies I prefer to make in cylindrical form, as shown, as this form is more readily manufactured, and serves the purpose better by leaving a uniform annular space for the porous material.

In making use of the cylinders, I introduce one of them into the central part of the press, and thereby displace a portion of the material to suit the smaller quantity of liquid used, different sizes being used according to the quantity of extract required.

By the use of these cylinders the process of making extracts is reduced to a perfectly-graduated system, as they compel the material to retain its perpendicular distance, and form a measure for the same, as well as for the liquid, so that the soluble properties can be as perfectly extracted from a small quantity of material as from a large one.

Having thus described my invention, what I claim as new is—

The combination, with an unyielding receptacle or press for the ground coffee or porous material, of one or more removable displacing-bodies, G, substantially as and for the purpose described.

JONATHAN MILLER.

Witnesses:
EDWD. W. BYRN,
CHAS. A. PETTIT.